Dec. 20, 1960 I. J. P. JAMES ET AL 2,965,711

APPARATUS FOR CORRECTING FOR TRANSMISSION VARIATIONS IN TELEVISION AND OTHER SIGNAL TRANSMISSION SYSTEMS

Filed Nov. 20, 1956 3 Sheets-Sheet 1

Inventors:
I. J. P. James
J. A. Lodge
by: Glascock Downing & Seebold
Attys.

Inventors
I. J. P. James
J. A. Lodge
By: Glascock Downing & Seebold
Attys.

Inventors
I. J. P. James
J. A. Lodge
By: Glascock Downing & Seebold
Attys.

United States Patent Office 2,965,711

Patented Dec. 20, 1960

2,965,711

APPARATUS FOR CORRECTING FOR TRANSMISSION VARIATIONS IN TELEVISION AND OTHER SIGNAL TRANSMISSION SYSTEMS

Ivanhoe John Penfound James, South Ealing, London, and James Alec Lodge, Sunbury-on-Thames, England, assignors to Electric & Musical Industries Limited, Hayes, Middlesex, England, a company of Great Britain Filed Nov. 20, 1956, Ser. No. 623,408

Claims priority, application Great Britain Nov. 24, 1955

7 Claims. (Cl. 178—7.2)

Figure 1:
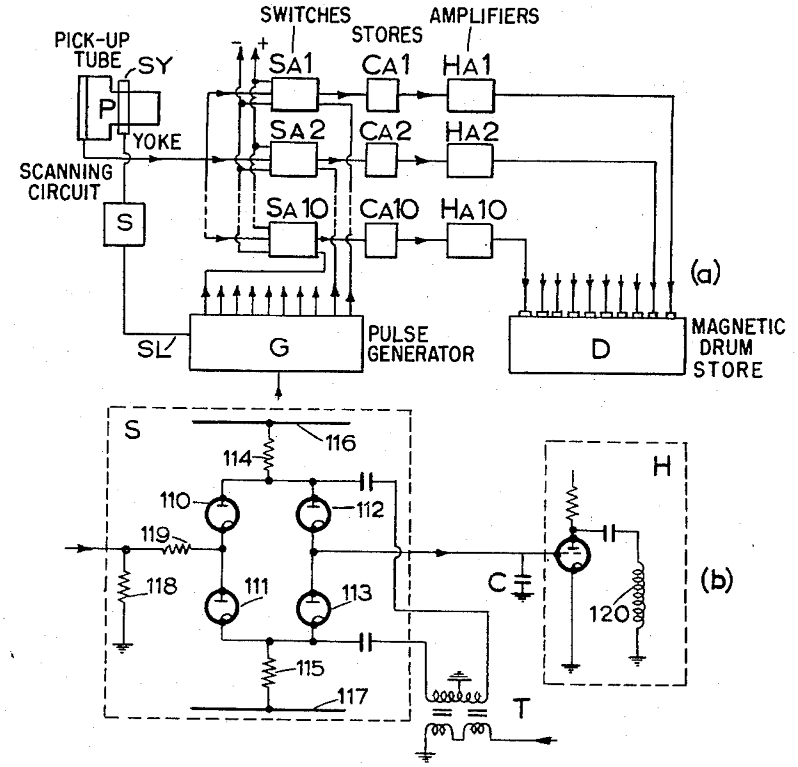

This invention relates to apparatus for correcting for transmission variations in television and other signal transmission systems.

In color television cameras three pick-up tubes may be used in order to analyse the picture into its three color components. In such cameras it is necessary to match the sensitivities of the three pick-up tubes over the whole of the picture area, otherwise unnatural color shadings are produced. If, for example, it is desired to transmit a perfectly white picture from such a camera, the outputs from the three pick-up tubes should be of equal amplitude and flat response, with variation not greater than 2 percent. Pick-up tube variations are of the order ±10 percent and in addition variations may occur due to nonuniformity of the dichroic beam-splitting arrangements.

Similar difficulties occur in color television system converters, for example in the so-called chromecoder, an apparatus for converting field-sequential color television signals to simultaneous signals, employing three cathode ray tubes, each displayed to a different one of three pick-up tubes; and in this case variations may also occur in the emissivity of the cathode ray tubes employed therein. Other types of color television cameras using one, or two pick-up tubes may also suffer from such difficulties.

It has been previously proposed to display the variations on a cathode ray tube and to photograph them, so that a negative is obtained which is scanned by a flying spot scanner in order to correct the errors in a gain control amplifier. This method of storing the correction information is however rather tedious since accurate development of the negative is necessary and it is not capable of being modified quickly. Also extra flying spot equipment is necessary.

The object of the present invention is to provide signal transmission apparatus having improved means for compensating for transmission variations.

According to the present invention there is provided signal transmission apparatus comprising means for translating an image into electrical signals, a magnetic storage medium for storing a representation of the transmission variations of said translation means, and means for modifying the transmission of said apparatus in response to signals derived from said storage means.

In one example of the invention a rotatable drum (or disc) magnetic store is used to store a representation of the non-uniformity of a photo-sensitive surface, for example, the photo-sensitive mosaic target of a television camera pick-up tube, the representation being referred to hereinafter as the error information. The drum is rotated, for example, once per field (50 times per second) or once per picture (25 times per second) and the error information is recorded magnetically in a magnetic coating of the drum. In addition, pulses can be recorded in order that the speed of rotation can be controlled by a servo-system. These pulses may be the line scanning pulses, or specific pulses for the purpose. Alternatively, the pulses can be generated from a special track stored on the drum. Such a drum can be provided with a number of "reading" heads and, if necessary separate tracks so that a number of different pick-up tube outputs may be corrected simultaneously.

The error information may be derived by projecting a light of uniform intensity on to the photo-sensitive mosaic of the pick-up tube, which tube is preferably arranged to operate with cathode potential stabilization, and obtaining an output signal (the error information) by scanning the mosaic. Other types of pick-up tube may be used, such as those employing a photo-cathode, or a photo-conductive surface. In the case of a system converter, a uniform signal may be applied to the display tube to derive the error information. The error information then gives a measure of the overall transmission errors, including the errors in the display tube, optical system and storage tube.

When the recorded error information corresponds to 100 percent transmission from the mosaic it is arranged that the output amplifier has a predetermined gain which may be termed "normal" and when the error information corresponds to only 80% transmission, say, then the gain of the output amplifier is increased to 125% of normal, that is to say, the gain of the output amplifier is made the reciprocal of the effective transmission of the system. Such gain control is referred to as dynamic gain control, and in arranging a dynamic gain control for television signals it is essential that the signal passing through the amplifier the gain of which is controlled, has its black level corresponding to zero signal, so that the gain changes do not affect the black level.

In a preferred form of the invention, the error information is recorded by means of a carrier modulated in frequency to inverse proportion to the sensitivity variations (that is, a carrier modulated in period), and the carrier after reproduction is detected in such a way that the output of the detector is directly proportional to the original frequency modulation. In this way the reciprocal of the error information can be accurately derived and applied directly in a dynamic gain control signal.

Conversely, the carrier may be modulated in frequency in direct proportion to the sensitivity variation, and the period detected to derive a signal which is inversely proportional to the original frequency modulation. When recording the error information on the drum other known methods of modulation (e.g. amplitude, pulse width, code or position) may alternatively be used, or the error information may be recorded directly as a video frequency signal, superimposed on any necessary bias.

In another form of the invention the error information is sampled every tenth of a line, say, the samples being applied in turn to respective recording heads of a group which are mounted along the drum, for example along a generator of a recording drum. Ten heads, say, are employed and the sensitivity is thus sampled at ten points along each line and recorded. By using this sampling method the positional errors due to the variations of phase of rotation of the drum are reduced, and in addition the bandwidth requirements of the recording system are reduced to the order of line frequency.

Figure 2:
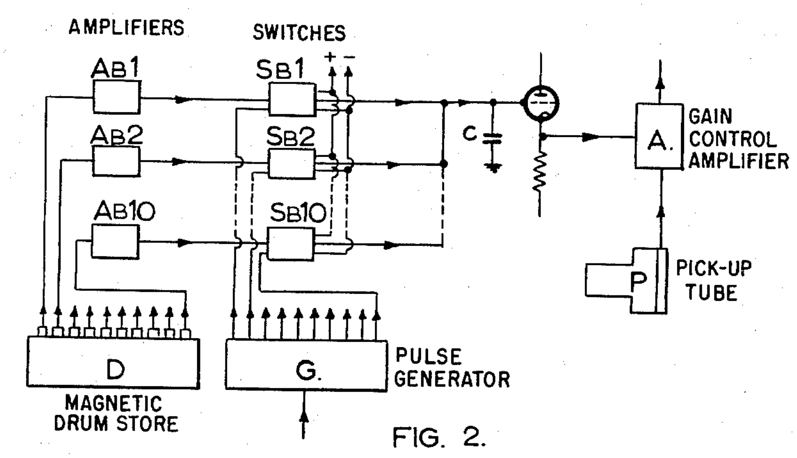
Figure 3:
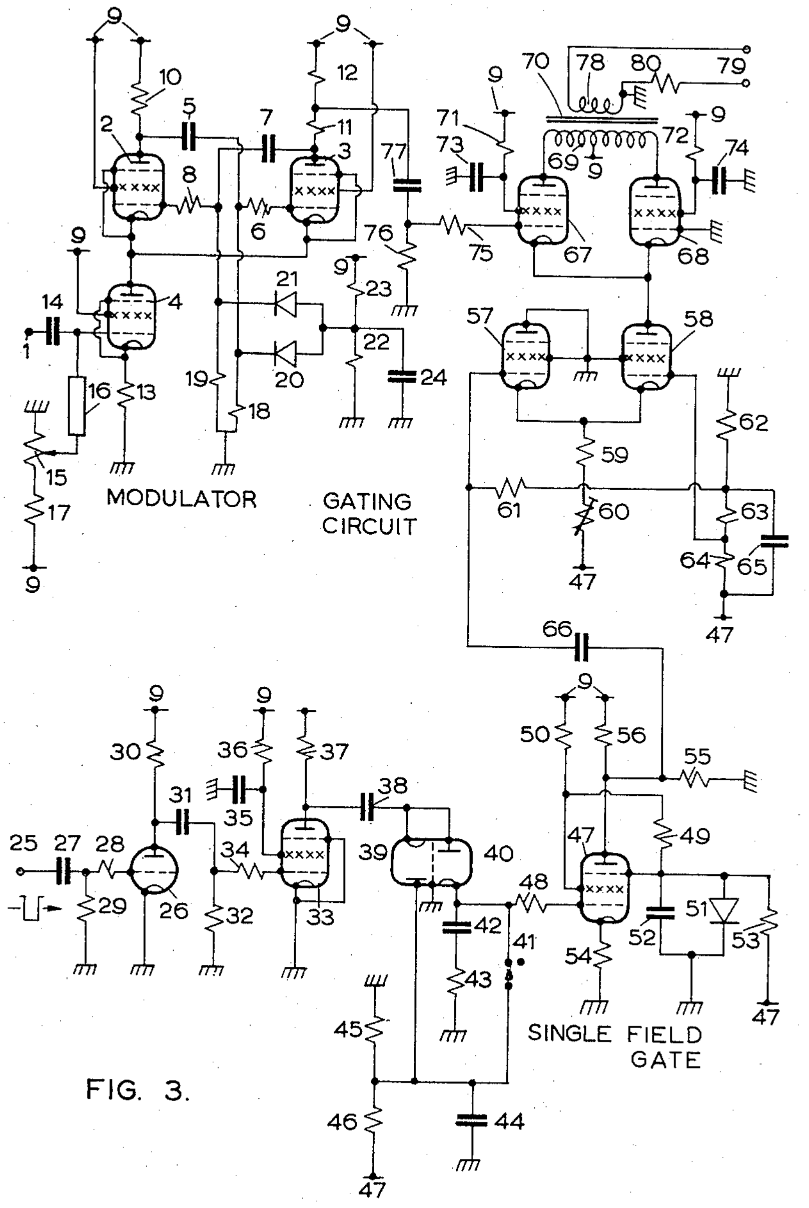
Figure 4:
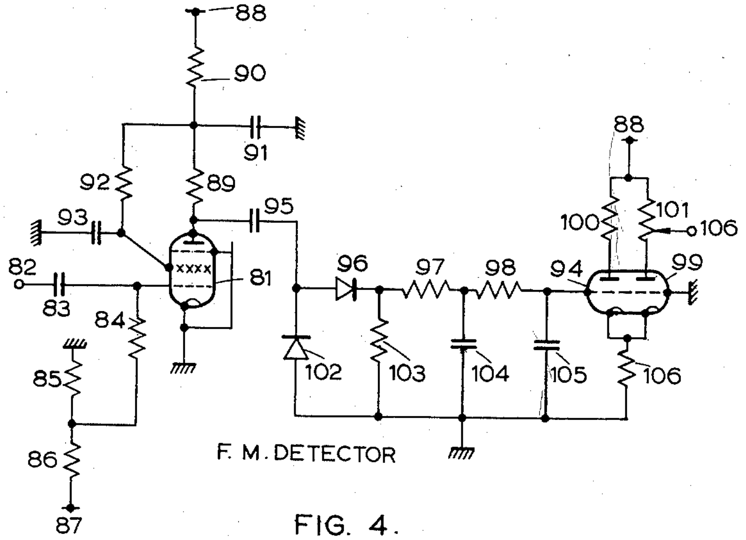

In order that the present invention may be clearly understood and readily carried into effect, it will now be described with reference to the accompanying drawings, in which:

Figure 1($a$) illustrates diagrammatically one example according to the present invention of means for recording a representation of the non-uniformity of a photo-electrically sensitive surface, Figure 1(*b*) illustrates in more detail part of Figure 1, Figure 2 illustrates means, according to the present invention, for generating control signals from a representation recorded as in Figure 1, Figure 3 illustrates a circuit arrangement for recording the error information as a frequency-modulated signal, Figure 4 illustrates the circuit arrangement of a suitable detector for use in conjunction with the apparatus of Figure 3.

In Figure 1, reference P denotes a television camera pick-up tube, which is one of three pick-up tubes or one color channel of a multi-color pick-up tube of a color television camera. The normal operating circuits of the tube are conventional except for an amplifier which is subjected to dynamic gain control to correct for transmission variations of the tube, which may be assumed to be due principally to sensitivity variations of the photo-electrically sensitive surface of the tube. The dynamic gain control is responsive to error information derived before commencing normal operation of the tube, by exposing the pick-up tube to a constant light for a short time which need only be of the order of one field or one picture period. When exposed to this light, tube P is scanned to derive a signal representing the transmission variations and this signal is applied in parallel to each of ten switches $S_A$1 to $S_A$10, only three of which are shown in Figure 1. The error signal is gated by the switches $S_A$1, $S_A$2 . . . $S_A$10 to the "writing" heads on a rotating magnetic drum D via storage condensers $C_A$1, $C_A$1 . . . $C_A$10 and amplifier circuits $H_A$1, $H_A$2 . . . $H_A$10. The switches are controlled by pulses from generator G, which is itself synchronized with the scanning circuit S which drives the scanning yoke SY of the pick-up tube P such that each line is sampled by the switches at ten points, equally spaced, the synchronizing means being represented by the connection SL. The switches are of a four-diode type and Figure 1(*b*) shows such a switch, say $S_A$1. The diodes are denoted by the references 110 to 113 connected as shown via resistors 114 and 115 to negative and positive bus-bars 116 and 117 respectively. The error signal from the tube P is applied over resistor 118 and via resistor 119, and the switch, which is normally open, is closed by a pulse from the generator G which is applied in push-pull by a transformer T to opposite sides of the switch. When the switch is open, the respective sample of the error signal is stored in the capacitor C and amplified by the amplifier $H_A$1, which is of conventional construction and has the coil 120 of the respective writing head in its anode circuit. Any necessary D.C., or H.F., biasing arrangements are not shown.

The generator G is of conventional construction and may be, for example, a ring counter, a delay network, or a chain circuit synchronized with line frequency. The magnetic drum D rotates in synchronism with the field deflection of the scanning means of pick-up tubes P, so that line samples of error information are recorded. Condenser C may be replaced by a low-pass-filter, or other temporary store.

Figure 2 illustrates a reproducing unit in which reading heads derive error information (relating to pick-up tube P) from a magnetic drum D, said record being obtained as above, which information is amplified by amplifiers $A_B$1, $A_B$2 . . . $A_B$10 and gated successively into the output line by switches $S_B$1, $S_B$2 . . . $S_B$10, as above, the output controlling the gain of dynamic gain control amplifier A inversely as the error information derived from the drum recording.

An advantage of the illustrated examples of the invention is that the operating bandwidth of the heads is greatly reduced by the use of storage condensers C and the heads have only to deal with signals having a repetition frequency of line rate, for example 10 to 15 kc./s. Also, variation of the speed of the drum can cause no lateral shift of the control waveform relative to the picture information displayed as would be the case with a single head.

In the latter example, according to the invention the sampling need not occur at equal intervals along a line but may be concentrated near the ends, where the rate of change of transmission tends to be the greatest.

To increase the effective definition of the error information without increasing the number of heads, at the expense of a proportionate increase in the recording frequencies, the gating circuits can be arranged so that the heads are used in sequence several times per line, instead of once as described above.

The arrangement illustrated in Figures 1 and 2 records the error information directly as a video frequency signal, but in order to reduce various distortions due to the magnetic drum store D itself, for example, eccentricity, holes in the magnetic layer, and phase errors, it is preferable to use frequency modulation in the recording process.

Figure 3 illustrates a practical circuit arrangement for recording the reciprocal of the error information, using frequency modulation.

The signal representing sensitivity variations are fed to a modulator via input terminal 1. This modulator comprises two pentode valves 2 and 3 with a common cathode connection to the anode of a further valve 4. The anode of valve 2 is connected to the control electrode of valve 3 via a series combination of a condenser 5 and a resistor 6, and the anode of valve 3 is connected to the control electrode of valve 2 via a series combination of a condenser 7 and a resistor 8, so that the valves 2 and 3 operate as a multivibrator. The anodes of valves 2 and 3 are taken to a positive high potential source 9 via anode resistors 10, and 11 and 12 in series, respectively. The screen electrodes of valves 2 and 3 are taken directly to the source 9 and the suppressor electrodes of these valves are connected directly to their respective cathodes. The valve 4 is also a pentode having its cathode grounded via a linearizing resistor 13 and screen electrode connected directly to the source 9. Input signals are applied to the control electrode of valve 4 via a condenser 14, which control electrode is also connected to a variable tapping point of one resistor 15 of a potential divider via a line-clamp switch 16, shown as a block. This potential divider is formed by resistor 15 together with a resistor 17 and is connected between ground and the source 9. The line-clamp switch 16 serves to reinsert the D.C. component of the signal applied at 1.

The joins of condensers 5 and 7 and resistors 6 and 8 are taken to ground via resistors 18 and 19, respectively, which joins are further connected to the midpoint of a potential divider via diode rectifiers 20 and 21, respectively. The latter potential divider comprises two resistors 22 and 23 connected between ground and the source 9 and having their join grounded via a condenser 24.

On the application of a signal input to the terminal 1 the anode current of valve 4 is varied in sympathy with the input. Thus, the cathode current of the valves 2 and 3 is similarly varied so that the time taken to charge or discharge between the critical potentials of the multivibrator as determined by the diodes 20 and 21 is proportional to the signal input at 1. Hence the period of the multivibrator output derived from the join of the anode resistors 11 and 12 normally determined by the setting of the tapping point on the resistor 15 will be modulated by the signal input and the frequency of this output will be modulated by the reciprocal of the signal input, since frequency=1/period.

Normally, sensitivity variations need only be derived from a particular apparatus, such as television apparatus, for a field period. A single field gate is included in the circuit of Figure 3 for the purpose of switching the output of the above described modulator during operation to recording apparatus for a single field only.

This single field gate has an input terminal 25 connected to the control electrode of a triode valve 26 via a condenser 27 and a resistor 28, the join of which latter components is grounded via a resistor 29. The cathode of valve 26 is grounded and its anode is connected to the source 9 by anode resistor 30. The anode of valve 26 is also grounded through a series combination of a condenser 31 and a resistor 32 having their join applied to the control electrode of a pentode valve 33 via a resistor 34. The valve 33 has its cathode and suppressor electrode grounded, and its screen electrodes connected to ground via a condenser 35 and to the source 9 via a resistor 36. The anode of valve 33 is also connected to the source 9 via a resistor 37 the output being derived from the anode and applied through a condenser 38 to the cathode of a diode valve 39 and the anode of a further diode valve 40. The valves 39 and 40 may be enclosed in a common envelope and separated by a grounded screen as shown. The cathode of diode 40 is joined to the anode of diode 39 by a micro-switch 41 and also to ground by a condenser 42 and a resistor 43 in series. The anode of diode 39 is grounded separately by a condenser 44 and a resistor 45 in parallel. The resistor 45 is one of a pair of resistors 45 and 46 forming a potential divider between ground and a negative high potential source 47.

The cathode of diode 40 is connected to the control electrode of a pentode valve 47 via a resistor 48. The valve 47 has its screen electrode joined to its suppressor electrode via a resistor 49 and to the source 9 via a resistor 50. The suppressor electrode of valve 47 is also grounded via a parallel combination of a diode rectifier 51 and a condenser 52 and taken to the source 47 via a resistor 53. The cathode of valve 47 is grounded through resistor 54 as is its anode through resistor 55, which anode is further connected to the source 9 by a resistor 56.

On the application of field trigger pulses, or pulses synchronized by the same, to the input terminal 25, these pulses are amplified by valves 26 and 33 and applied with their original negative polarity amplified to the cathodes of diodes 39 and 40. However, so long as the micro-switch 41 is closed as shown, the potential at the control electrode of the valve 47 is hardly affected by the trigger pulses.

If, however, the switch 41 is opened the cathode of the diode 40 is disconnected from the potentiometer 45, 46 and the condenser 44 and the positive potential excursions, which occur at the anode of the valve 33 at the end of a trigger pulse charge condenser 42, thereby producing a staircase waveform at the control electrode of 47.

It will be assumed moreover that the minimum "open" time of micro-switch 41 in response to a single activation is several field periods. The potential at the control electrode of the valve 47 will be a positive-going staircase waveform. When this control electrode is raised to a positive potential, valve 47 conducts to its anode, and the anode potential falls. During the next field trigger pulse the staircase waveform causes the anode potential of 47 to drop to such an extent that current flows then to the screen electrode. The fall in potential at the screen electrode is passed via a comparatively short time constant comprising 49 and 52 to the suppressor electrode of 47, which fall in potential cuts off the anode current. The resistor 54 is provided to ensure that the anode current is cut off by the suppressor electrode as the potential at the control electrode becomes more positive. In particular, the time constant of 52, 53 and operational potentials are so chosen that valve 47 is caused by a field trigger pulse to conduct to its anode for a field period only. The valve 47 will of course remain conducting to its screen electrode so long as the micro-switch is open.

The change of anode potential of valve 47 during conduction serves as an output signal to operate a gating circuit. As shown, the gating circuit comprises two pentode valves 57 and 58 having their screen electrodes grounded by a common connection and their cathodes taken to the source 47 by a common series combination of a resistor 59 and a variable resistor 60. The valve 57 has its anode grounded together with the screen electrode and its control electrode connected by a resistor 61 to the join of resistors 62 and 63 connected with a further resistor 64 in a potential divider chain between ground and the source 47. Condenser 65 is a smoothing condenser. The control electrode of the valve 58, is connected to the join of 63 and 64 in the divider chain so that normally the valve 57 conducts while the valve 58 remains non-conducting.

The anode of the valve 47 of the single field gate is connected to the control electrode of the valve 57 via a condenser 66 so that whilst the valve 47 is conducting for a field and its anode potential is low then the potential applied to the control electrode of valve 57 is also low. Thus valve 57 is maintained non-conducting for a field period, enabling valve 58 to conduct during that time.

The anode of valve 58 is connected directly to the cathodes of two pentode valves 67 and 68 having their anodes connected to different ends of the primary windings 69 of a transformer 70. This primary winding has its centre point connected to the source 9. The screen electrodes of valves 67 and 68 are connected to the source 9 via resistors 71 and 72 and are grounded via condensers 73 and 74, respectively. The control electrode of valve 68 is grounded, whilst that of valve 67 is connected by a resistor 75 to the join of a series connected resistor 76 and condenser 77 between ground and the join of anode resistors 11 and 12 of valve 3.

Hence, frequency-modulated signals are applied to the control electrode of valve 67 which operates as a push-pull amplifier together with valve 68. This amplifier, however, can only operate when the valve 58 conducts since at that time this valve open-circuits the cathode lead of the valves 67 and 68. During such operation frequency-modulated signals are derived in the secondary winding 78 of transformer 70, one end of which winding 78 is grounded and connected to one of a pair of terminals 79 via a monitoring resistor 80. The other end of the winding 78 is connected to the other terminal 79, which terminals 79 form the output terminals to the recording head or heads of a magnetic drum store in a gating arrangement such as shown in Figure 1. The micro switch 41 may be operated in known manner when a transmitter is switched on or at any other desired time.

On playing back the recorded frequency modulated control signal, the output derived from the reproducing head of the magnetic drum store would normally be passed first through an amplifier although one is not shown in Figure 4. Figure 4 shows a suitable frequency-modulation detector circuit for use with recording equipment as described in relation to Figure 3. This detector circuit comprises a pentode valve 81 with its suppressor electrode grounded together with its cathode. The amplified frequency-modulated control signal from the reproducing head is applied to the control electrode of valve 81 via input terminal 82 and condenser 83. The control electrode of valve 81 is also connected by a resistor 84 to the join of two resistors 85 and 86 forming a potential divider between ground and a negative potential source 87. The anode of valve 81 is connected to a positive potential source 88 by two series connected resistors 89 and 90, the join of which resistors is grounded via a condenser 91 and connected to the screen electrode of valve 81 via a resistor 92. The screen electrode of valve 81 is also grounded via a condenser 93.

The anode of valve 81 is connected to the control grid of a triode valve 94 via a series combination of a condenser 95, a diode rectifier 96, and two resistors 97 and 98. The valve 94 is one of a pair of triode valves 94 and 99 in a single envelope having respective anode resistors 100 and 101 connected to the source 88. The joins of the components of the series combination of condenser 95, rectifier 96 and resistors 97 and 98 are grounded at a common point via a diode rectifier 102, a resistor 103, and condensers 104 and 105, respectively, the cathodes of valves 94 and 99 being connected to this common ground point also via a common cathode resistor 106. The control electrode of valve 99 is grounded and an output terminal 106 connected to a tapping point on its anode resistor 101.

The valve 81 operates as a limiter in a conventional manner to limit amplitude variations in the frequency modulated signal input at terminal 82. During each successive cycle of the output of the limiter 81 the condenser 95 is alternately charged and discharged through the diodes 96 and 102, the charging current through the diode and the network comprising 96 being shared by the condenser 104. The charge on condenser 104 tends to leak off through resistors 97 and 103 and equilibrium is attained when the average discharge current through resistors 97 and 98 is proportional to the rate of charge and discharge of condenser 95. The resultant voltage across the condenser 104 is applied via 98 and 105 to the valves 94 and 99 which operate as a conventional stable amplifier with no phase shift to set up an output representing the modulation component of the input signal at terminal 82, that is, the desired control signal.

The arrangement shown in Figures 3 and 4 records the error information by modulating the period of a carrier, and derives the reciprocal of the error signal by detecting the frequency of the carrier after reproduction. The converse arrangement can also be adapted, namely of recording the error information by modulating the frequency of a carrier and deriving the reciprocal of the error signal by detecting the period of the carrier after reproduction.

The arrangement shown in Figures 3 and 4 is intended for recording the error information on the drum as a continuous signal corresponding to a field. A similar arrangement, or its converse, could be applied to arrangements similar to Figure 1 in which successive samples of the signal representing the error information are recorded in a cyclic order by a plurality of recording heads and reproduced in a complementary manner. As aforesaid, moreover, other methods of modulation may be employed, and while in the arrangements described the carrier which is modulated is in the form of pulses, the carrier may also be a sinusoidal waveform.

If the error information is recorded as amplitude modulation of a carrier, or directly as a video frequency signal, a pilot or signal of reference amplitude may be recorded simultaneously with the error information and separated, after reproduction, from the error information on a frequency basis and used as an automatic gain control signal on the reproduced error information. No such pilot signal is of course required if the error information is recorded as frequency modulation of a carrier, or some other time characteristic of a carrier, such as by pulse width, code, or position modulation.

A number of ways of designing the servo-system for rotating a drum can be used, for instance, the method described by F. C. Williams et al. (Proc. I.E.E., Part II, No. 61, February 1951, vol. 98, page 29, and Part II, No. 68, April 1952, vol. 99) employs an induction motor controlled by a magnetic brake. Other suitable known methods use a synchronous motor in conjunction with a torsion bar connecting the drum to the motor.

If the motor rotates once per picture (25 times per second) then one head and one track only are required per signal. However, if the speed of rotation is once per field (50 times per second) a difficulty due to the use of interlaced scanning arises, since alternate fields have their lines displaced by half a line period. One way of overcoming this difficulty is to use two heads on the one track, the heads being spaced by a small odd multiple of half a line period, and by switching alternatively from one to the other every field. It is assumed that the error signals on the two fields are sufficiently identical for this arrangement. Alternatively, two heads on separate tracks can be used and these can also be switched once per field.

To reduce positional errors in the drum rotation, the drum is best run as fast as possible, up to five times the field frequency, say, but this will involve the use of a greater number of tracks. If the transmission variations in such a drum are below $\pm 0.5$ db, if the maximum variations in the tube ouput signals amount to 20 percent of the original constant signal, and if variations of tube output are recorded as amplitude modulation or as a video signal, the full modulation characteristic of the drum may be used to record the variations only by subtracting a D.C. potential from the signal, thus the overall error of the error information output is not worse than $\pm 0.1$ db. The subtracted D.C. potential component may be re-introduced after reproduction of error information from the store.

For a 625 line, 50 field/second system, the line frequency is 15 kc./s. If one assumes the maximum number of up and down errors along each line is 40, then the maximum frequency is equal to 20×line frequency i.e. 300 kc./s., which is approximately 1/10 of the normal video bandwidth. Assuming that the frequency response of a record can be flat up to a frequency at which the effective gap is $\lambda/2$, and that such a gap is 1.7/1000 of an inch then the required drum velocity is 1000"/second and if the drum rotates at 3000 r.p.m. (50 times/second) then its diameter needs to be approximately 7".

Although the invention has been described with reference to a single pick-up tube, clearly the invention may be applied to more than one such tube and also to system converters and other systems not employing photosensitive pick-up tubes.

In the case of a color television camera or system converter comprising three channels for different color components, red, green and blue, for example, referred to hereinafter as R, G, B in the usual notation, it may be considered unsuitable to correct the G signal due to the resultant noise caused by so doing. Thus, the R and B signals may have the G channel transmission variations superimposed on them to maintain a correct color balance at the expense of errors in luminance as is proposed in British patent application No. 36,090/55. This may be achieved by modifying the dynamic gain control amplifier A (Figure 2) of the R and B channel pick-up tubes in accordance with the present invention and at the same time in proportion to error information derived from the G channel. This latter G channel error information may, for example, be superimposed on to the reciprocals of that of the R and B channels by changing the connections to ground via resistors from the control electrodes of the multivibrator valves of the modulator of Figure 3 to a connection to a potential varying in proportion to error information derived from the G channel. Alternatively, the R and B channel pick-up tubes may be exposed to an image derived in response to electrical signals which are derived from the G channel pick-up tube in response to a constant light or image, and the resultant output of the modulator stored in accordance with the present invention.

Clearly, the above proposal is not limited to R, G, B color television apparatus but may equally well be applied to apparatus employing a luminance signal Y, for example, together with two other primary signals, such as the X and Z signals, or R and B signals. The invention may also be applied to monochrome system converters such as may be used for relaying signals of one standard to receivers of another standard, or for band-compressing system converters.

What we claim is:

1. Signal transmission apparatus comprising a target for storing signals representing an image, means for scanning said target according to a television raster to reproduce said signal, said signals being susceptible to transmission variations corresponding to different elements of said target, a magnetic storage medium for recording said transmission variations as variations of magnetization, means synchronized with said scanning means for deriving a correcting signal from said storage medium and means responsive to said correcting signal for modifying signals transmitted by said apparatus to correct said signals for said transmission variations.

2. Apparatus according to claim 1, said magnetic storage medium comprising a magnetic drum, said signal deriving means comprising a plurality of electromagnetic transducing heads spaced along said drum, means for effecting relative motion between said heads and said drum, a common output channel, and means for gating signals derived from said heads in cyclic order to said output channel to form said correcting signal, there being signals representing successive samples of said transmission variations recorded on said drum at spaced positions predetermined in relation to the cyclic order of gating signals from said heads to said output channel.

3. Apparatus according to claim 1 wherein said magnetic storage medium comprises a magnetic drum store and means are provided for recording signals representing transmission variations on said drum, including a plurality of recording electromagnetic heads spaced along said drum, means for conditioning said apparatus to derive a signal representing said transmission variations and gating means for gating successive samples of said signal representing transmission variations in cyclic order to said recording heads.

4. Apparatus according to claim 2, said gating means being operative to produce sampling of said signals representing transmission variations a plurality of times during each line of said raster.

5. Apparatus according to claim 1 comprising means for producing a carrier wave and modulating means for modulating the period of said carrier wave in response to a signal representing transmission variation and means for applying said carrier so modulated to said storage medium, said modifying means comprising means for detecting frequency variations of said carrier to derive a control signal and means for amplifying said electrical signals with a gain variable in response to said control signal.

6. Apparatus according to claim 1 comprising means for producing a carrier wave and modulating means for modulating the frequency of said carrier wave in response to a signal representing transmission variations and means for applying said carrier so modulated to said storage medium, said modifying means comprising means for detecting period variations of said carrier to derive a control signal and means for amplifying said electrical signals with a gain variable in response to said control signal.

7. Apparatus according to claim 1 wherein said transmission variations are recorded as variations of magnetization without a D.C. component and said modifying means comprises means for superimposing a constant D.C. component on signals derived from said medium in response to variations stored thereon.

References Cited in the file of this patent

UNITED STATES PATENTS

| | | |
|---|---|---|
| 2,606,245 | Hall | Aug. 5, 1952 |
| 2,695,331 | Johnson | Nov. 23, 1954 |

FOREIGN PATENTS

| | | |
|---|---|---|
| 460,721 | Great Britain | Feb. 3, 1937 |
| 166,552 | Australia | Jan. 16, 1956 |